United States Patent
Takeuchi et al.

(10) Patent No.: US 11,708,085 B2
(45) Date of Patent: Jul. 25, 2023

(54) TRAVELING SUPPORT DEVICE, CONTROL DEVICE, AND NON-TRANSITORY COMPUTER-READABLE MEDIUM

(71) Applicant: KABUSHIKI KAISHA TOKAI RIKA DENKI SEISAKUSHO, Aichi (JP)

(72) Inventors: Shuhei Takeuchi, Aichi (JP); Aya Kadono, Aichi (JP); Masahiko Miyata, Aichi (JP); Motohiro Kojima, Aichi (JP); Yoshimasa Miura, Aichi (JP); Koji Iwakata, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/634,589

(22) PCT Filed: Aug. 5, 2020

(86) PCT No.: PCT/JP2020/030033
§ 371 (c)(1),
(2) Date: Feb. 11, 2022

(87) PCT Pub. No.: WO2021/033550
PCT Pub. Date: Feb. 25, 2021

(65) Prior Publication Data
US 2022/0274622 A1    Sep. 1, 2022

(30) Foreign Application Priority Data
Aug. 21, 2019   (JP) ................................. 2019-151131

(51) Int. Cl.
*B60W 50/16* (2020.01)
*B60W 40/08* (2012.01)
(Continued)

(52) U.S. Cl.
CPC ............ *B60W 50/16* (2013.01); *B60W 40/08* (2013.01); *G08B 21/06* (2013.01);
(Continued)

(58) Field of Classification Search
CPC .............. B60W 50/16; B60W 40/08; B60W 2040/0827; B60W 2050/143; B60W 2050/146; B60W 2540/229; G08B 21/06
See application file for complete search history.

(56) References Cited

U.S. PATENT DOCUMENTS

| 10,053,107 B2 * | 8/2018 | Fujimoto ............... B60W 50/08 |
| 2015/0198448 A1 * | 7/2015 | San .................... G01C 21/3632 701/400 |
| 2016/0250968 A1 | 9/2016 | Shirakata et al. |
| 2017/0261982 A1 * | 9/2017 | Otaki ................... G05D 1/0088 |

(Continued)

FOREIGN PATENT DOCUMENTS

| JP | 10203197 A * | 8/1998 |
| JP | 2006-205794 A | 8/2006 |
| JP | 2008-077631 A | 4/2008 |

(Continued)

OTHER PUBLICATIONS

International Search Report (including English Language Translation), dated Oct. 20, 2020, by the Japan Patent Office (JPO), in International Application No. PCT/JP2020/030033.

(Continued)

*Primary Examiner* — Mohamed Barakat
(74) *Attorney, Agent, or Firm* — Greenblum & Bernstein P.L.C.

(57) ABSTRACT

An awakening degree detecting device outputs awakening degree information corresponding to an awakening degree of a driver of a vehicle. A stimulus providing device provides the driver with a stimulus including at least one of a vibration stimulus imparting vibration and an apparent motion stimulus giving an illusion of motion presence. A control device outputs, based on the awakening degree (Continued)

information, a first control signal causing the stimulus providing device to provide the stimulus in a case where the awakening degree is less than a first threshold, and to output a second control signal causing the stimulus providing device to provide the stimulus after the first control signal is outputted.

6 Claims, 7 Drawing Sheets

(51) Int. Cl.
G08B 21/06 (2006.01)
B60W 50/14 (2020.01)
(52) U.S. Cl.
CPC ............ *B60W 2040/0827* (2013.01); *B60W 2050/143* (2013.01); *B60W 2050/146* (2013.01); *B60W 2540/229* (2020.02)

(56) References Cited

U.S. PATENT DOCUMENTS

2019/0005797 A1* 1/2019 Yamaguchi ............ G08B 21/06
2020/0082700 A1* 3/2020 Shikii ................... A61M 21/00

FOREIGN PATENT DOCUMENTS

| JP | 2015-132997 | A |   | 7/2015 |
|----|-------------|---|---|--------|
| JP | 2016-162015 | A |   | 9/2016 |
| JP | 2017-228280 | A |   | 12/2017 |
| JP | 2019038471  | A | * | 3/2019 |
| JP | 2019-096368 | A |   | 6/2019 |

OTHER PUBLICATIONS

Written Opinion of the International Searching Authority (including English Language Translation), dated Oct. 20, 2020, by the Japan Patent Office (JPO), in International Application No. PCT/JP2020/030033.

* cited by examiner

| PROVIDING POSITION \ TYPE | ELECTRICAL STIMULUS | WARM STIMULUS | COLD STIMULUS |
|---|---|---|---|
| SEAT 21 | ◯ | ◯ | ◯ |
| SEAT BELT 22 | ◯ | ◯ | ◯ |
| STEERING WHEEL 23 | ◯ | | ◯ |

| PROVIDING POSITION \ TYPE | ELECTRICAL STIMULUS |
|---|---|
| SEAT 21 | ↻ D |
| SEAT BELT 22 | ⬍ E |
| STEERING WHEEL 23 | |

*FIG. 8*

| PROVIDING POSITION \ TYPE | ELECTRICAL STIMULUS | WARM STIMULUS | COLD STIMULUS |
|---|---|---|---|
| STEERING WHEEL 23 | ↻ F | ⬌ G | |

TRAVELING SUPPORT DEVICE, CONTROL DEVICE, AND NON-TRANSITORY COMPUTER-READABLE MEDIUM

FIELD

The presently disclosed subject matter relates to a traveling support device adapted to be installed in a mobile entity. The presently disclosed subject matter also relates to a control device adapted to be installed in a mobile entity for controlling a stimulus providing device configured to provide an occupant of the mobile entity with a stimulus including at least one of a vibration stimulus imparting vibration and an apparent motion stimulus giving an illusion of motion presence, as well as a non-transitory computer-readable medium having stored a computer program adapted to be executed by a processor of the control device.

BACKGROUND

Japanese Patent Publication No. 2019-096368A discloses a technique for performing a traveling support by notifying an occupant that a traveling environment of a mobile entity satisfies a specific condition.

As used herein, the term "traveling environment" is used comprehensively to mean a state of an external environment of a mobile entity, a state of the mobile entity itself, and a state of an occupant of the mobile entity.

SUMMARY

Technical Problem

It is demanded to perform the traveling support by suppressing a decrease in an awakening degree of the occupant.

Solution to Problem

In order to meet the demand described above, an illustrative aspect of the presently disclosed subject matter provides a traveling support device adapted to be installed in a mobile entity, comprising:

an awakening degree detecting device configured to output awakening degree information corresponding to an awakening degree of an occupant of the mobile entity;

a stimulus providing device configured to provide the occupant with a stimulus including at least one of a vibration stimulus imparting vibration and an apparent motion stimulus giving an illusion of motion presence; and a control device configured to output, based on the awakening degree information, a first control signal causing the stimulus providing device to provide the stimulus in a case where the awakening degree is less than a first threshold, and to output a second control signal causing the stimulus providing device to provide the stimulus after the first control signal is outputted.

In order to meet the demand described above, an illustrative aspect of the presently disclosed subject matter provides a control device adapted to be installed in a mobile entity to control a stimulus providing device configured to provide an occupant of the mobile entity with a stimulus including at least one of a vibration stimulus imparting vibration and an apparent motion stimulus giving an illusion of motion presence, the control device comprising:

an input interface configured to receive awakening degree information corresponding to an awakening degree of the occupant;

a processor configured to generate, based on the awakening degree information, a first control signal and a second control signal each causing the stimulus providing device to provide the stimulus in a case where the awakening degree is less than a first threshold; and an output interface configured to output the second control signal after the first control signal is outputted therefrom.

In order to meet the demand described above, an illustrative aspect of the presently disclosed subject matter provides a non-transitory computer-readable medium having stored a computer program to be executed by a control device adapted to be installed in a mobile entity to control a stimulus providing device configured to provide an occupant of the mobile entity with a stimulus including at least one of a vibration stimulus imparting vibration and an apparent motion stimulus giving an illusion of motion presence, the computer program being configured to, when executed, cause the control device to:

output, based on awakening degree information corresponding to an awakening degree of the occupant, a first control signal causing the stimulus providing device to provide the stimulus in a case where the awakening degree is less than a first threshold; and output a second control signal causing the stimulus providing device to provide the stimulus after the first control signal is outputted.

The stimulus provided based on the first control signal serves to notify the occupant of a decrease in the awakening degree. As a result, the awakening degree of the occupant is prompted to be recovered. However, there may be a case where the recovery of the awakening degree of the occupant is insufficient only with the stimulus. According to the above configuration, after the stimulus based on the first control signal is provided, the stimulus based on the second control signal is additionally provided. As a result, the awakening degree of the occupant is further prompted to be recovered. Therefore, traveling support can be realized by suppressing a decrease in the awakening degree of the occupant.

DESCRIPTION OF EMBODIMENTS

Figure 1:
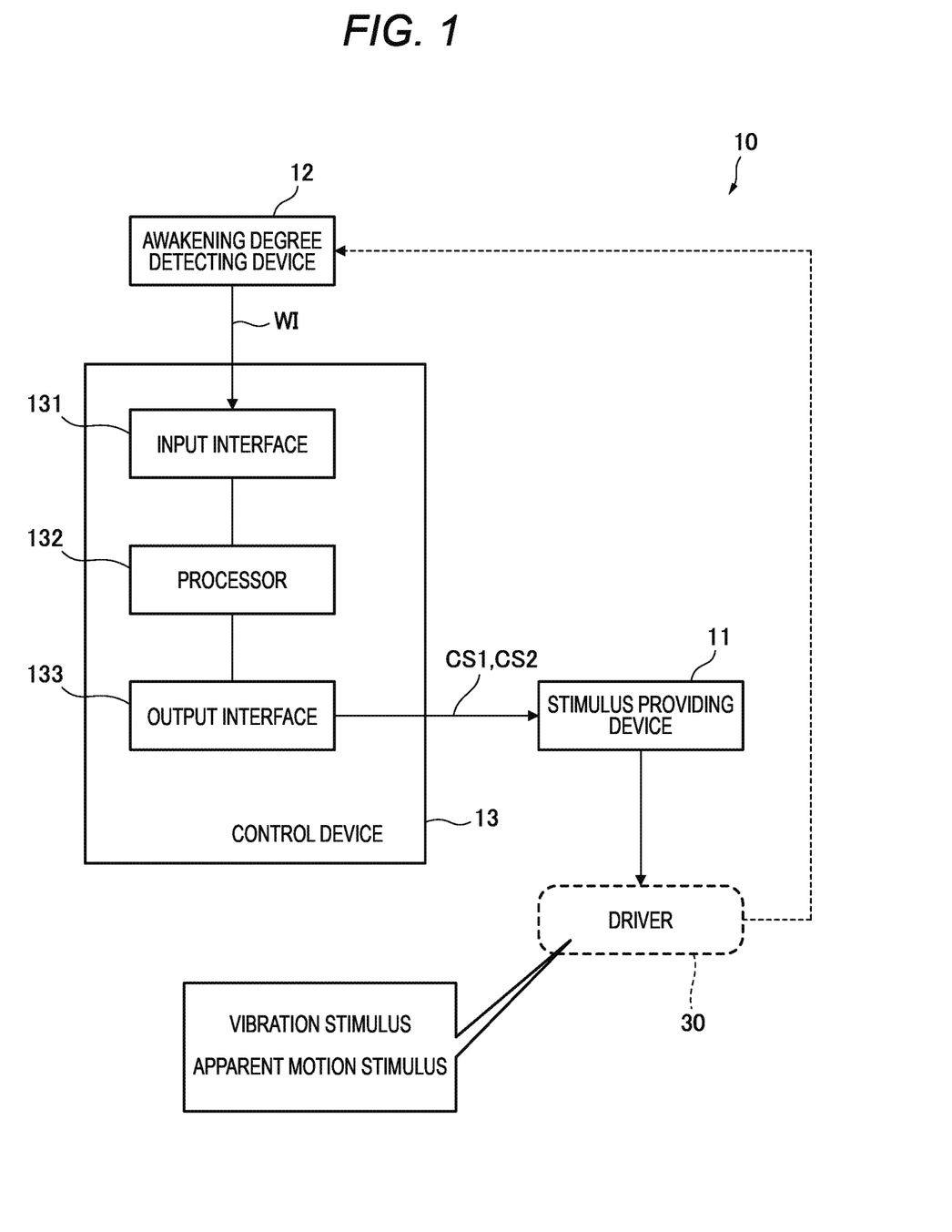
FIG. 1 illustrates a functional configuration of a traveling support device according to an embodiment.

Exemplary embodiments will be described in detail below with reference to the accompanying drawings. FIG. 1 illustrates a functional configuration of a traveling support device 10 according to an embodiment.

Figure 2:
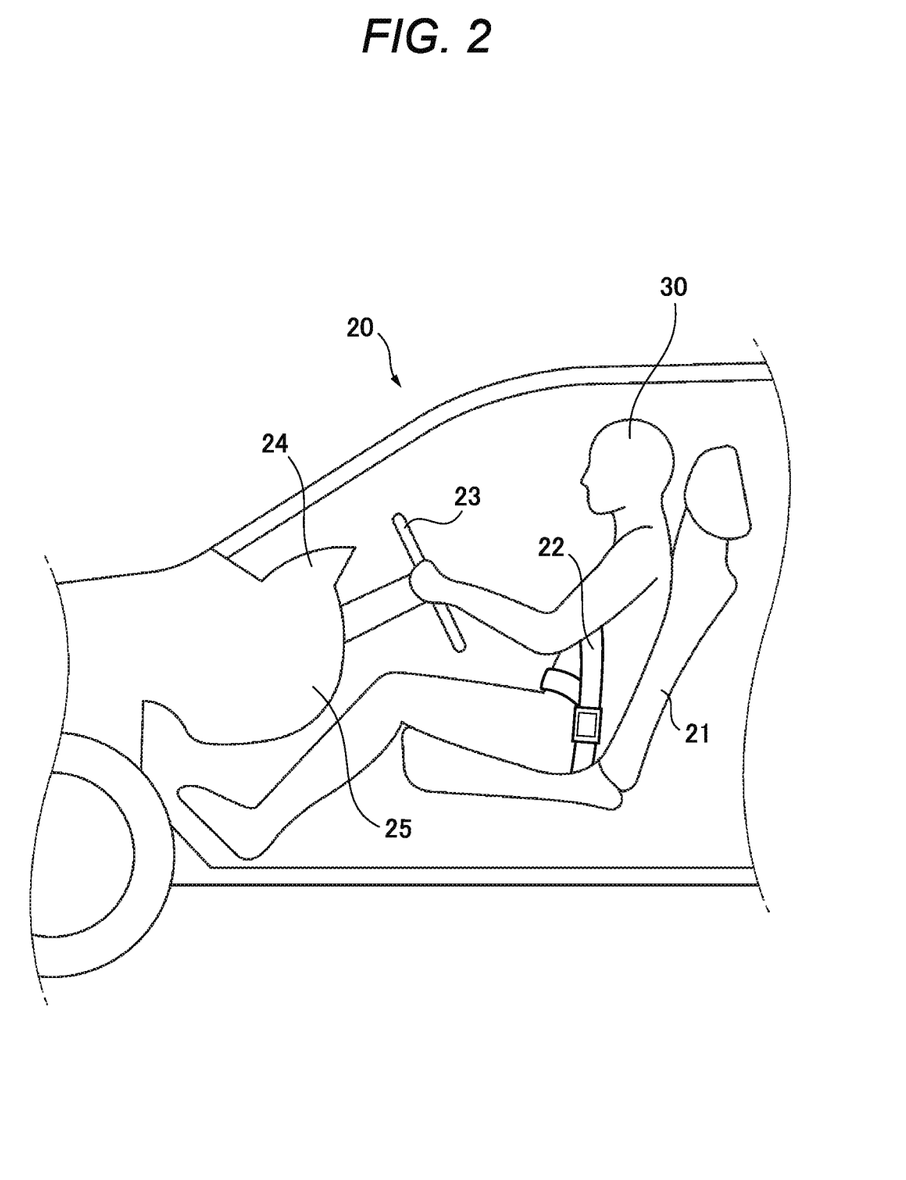
FIG. 2 illustrates a vehicle in which the traveling support device of FIG. 1 is to be installed.

The traveling support device 10 is installed in a vehicle 20 as illustrated in FIG. 2. The vehicle 20 is an example of a mobile entity. In FIG. 2, a state that a driver 30 is seated on a seat 21 is illustrated. The driver 30 is an example of an occupant of the mobile entity. The driver 30 wears a seat belt 22. The driver 30 grips a steering wheel 23.

As illustrated in FIG. 1, the traveling support device 10 includes a stimulus providing device 11, an awakening degree detecting device 12, and a control device 13.

The stimulus providing device 11 is a device for providing a driver 30 with a stimulus including at least one of a vibration stimulus and an apparent motion stimulus.

The vibration stimulus is a stimulus for imparting vibration to the driver 30. The vibration is applied through a contact member adapted to contact a portion of the body of the driver 30. Each of the seat 21, the seat belt 22, and the steering wheel 23 is an example of the contact member. A head rest or an arm rest may also be an example of the contact member.

The vibration may be generated through the use of an actuator, a piezoelectric element, a voice coil, a solenoid, an eccentric motor, and the like. The vibration as generated is transmitted to the contact member through an appropriate configuration.

The apparent motion stimulus is a stimulus for causing the driver 30 to have an illusion of motion presence. By satisfying appropriate conditions for positions and timings at which a plurality of instantaneous stimuli are provided with respect to the driver 30, the driver 30 perceives that the stimulus is moving even if each instantaneous stimulus is provided without motion. As the stimulus, at least one of a visual stimulus, an auditory stimulus, a vibration stimulus, an electrical stimulus, a warm stimulus, and a cold stimulus is used.

The visual stimulus is provided through a light emitter or a display device provided on a meter panel 24, a center cluster 25, a center console (not illustrated), and the like of the vehicle 20. That is, the light emitter and the display device are examples of the stimulus providing device 11. Examples of the visual stimulus include light emission from the light emitter, display of a symbol or a text in the display device, and the like.

The auditory stimulus is provided through a speaker (not illustrated) provided in the vehicle 20. Namely, the speaker is an example of the stimulus providing device 11. Examples of the auditory stimulus include a warning sound and the like.

Each of the vibration stimulus, the electrical stimulus, the warm stimulus, and the cold stimulus is provided as a tactile stimulus through the contact member.

The electrical stimulus is provided through an electrode formed on a surface of the contact member. For example, a current of 2-5 mA is supplied through the electrode in order to cause the driver 30 to perceive the electrical stimulus without causing pain. Namely, the device for supplying current through the electrode is an example of the stimulus providing device 11.

The warm stimulus is provided by causing the surface temperature of the contact member to be higher than ambient temperature. The warm sensation can be provided through an operation of a heater or the like. Namely, the heater and a device for controlling the operation thereof are an example of the stimulus providing device 11.

The cold stimulus is provided by causing the surface temperature of the contact member to be lower than the ambient temperature. The cold sensation may be provided through an operation of a Peltier element or the like.

Namely, the Peltier element and the device for controlling the operation thereof are an example of the stimulus providing device 11.

Figure 3:
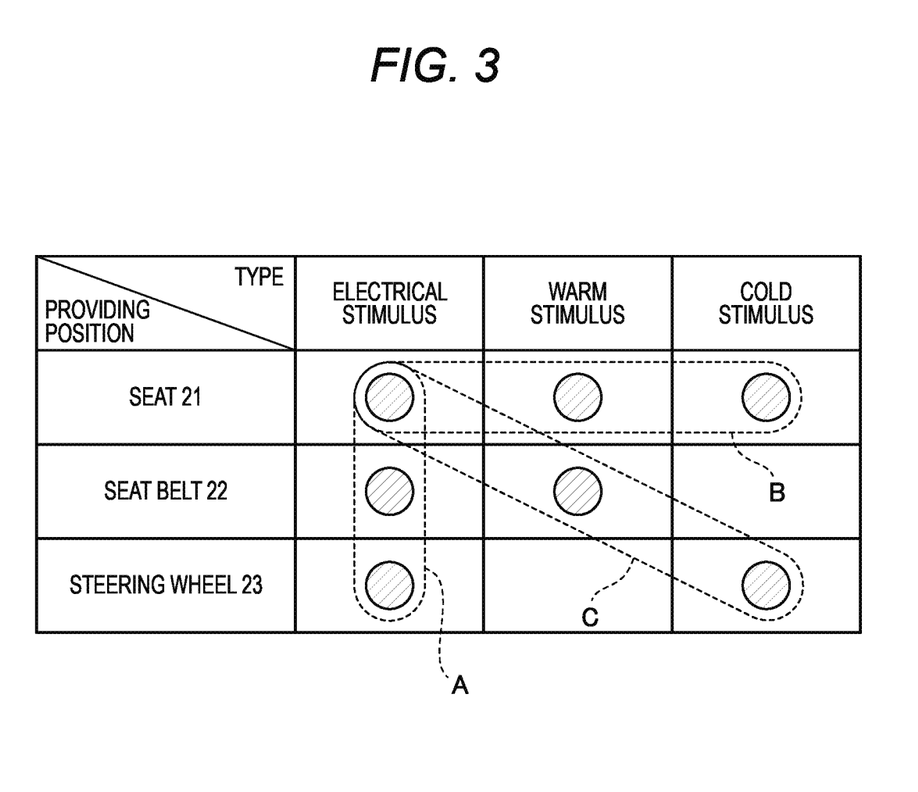
FIG. 3 illustrates a configuration of a stimulus providing device of FIG. 1.

The relationship between the type of tactile stimulus to be provided and the position at which the tactile stimulus is to be provided can be arbitrarily determined. FIG. 3 illustrates a table showing examples of possible combinations.

The pattern A includes possible combinations arranged in the up-down direction of the table. It is illustrated an example wherein each of the seat 21, the seat belt 22, and the steering wheel 23 provides an electrical stimulus. In other words, any possible combinations wherein the same kind of tactile is provided from each of different kinds of contact members may be included in the pattern A. For example, combinations wherein a warm sensation is provided from each of the seat belt 22 and the steering wheel 23 may be included in the pattern A.

The pattern B includes possible combinations arranged in the left-right direction of the table. It is illustrated an example wherein all of the electrical stimulus, the warm sensation, and the cold sensation are provided from the seat 21. In other words, any possible combinations wherein different kinds of tactiles are presented from the same contact member may be included in the pattern B. For example, combinations wherein a warm sensation and a cold sensation are provided from the steering wheel 23 may be included in the pattern B.

The pattern C includes possible combinations arranged in neither the up-down direction nor the left-right direction of the table. It is illustrated an example wherein an electrical stimulus is provided from the seat 21, a warm sensation is provided from the seat belt 22, and a cold sensation is provided from the steering wheel 23. In other words, any possible combinations wherein different kinds of tactiles are provided from different kinds of contact members may be included in the pattern C. For example, combinations wherein a cold sensation is provided from the seat belt 22 and an electrical stimulus is provided from the steering wheel 23 may be included in the pattern C.

In this example, the stimulus providing device 11 defines a relationship between the type of tactile stimulus to be provided and the position at which the tactile stimulus is provided based on at least one of the pattern A, the pattern B, and the pattern C.

As illustrated in FIG. 1, the awakening degree detecting device 12 is a device configured to detect an awakening degree of the driver 30, and to output awakening degree information WI corresponding to the awakening degree as detected. The awakening degree of the driver 30 can be determined based on physiological information such as a change in a heart rate, an eye movement, a change in a facial expression, and a body motion. The change in the heart rate may be acquired through an electrode provided on the steering wheel 23, or may be acquired from a wearable device attached to the driver 30 via wireless communication. The eye movement, the change in the facial expression, and the body motion can be acquired by a camera (not illustrated) disposed at an appropriate position in a vehicle cabin. Since the configuration itself of the awakening degree detecting device 12 for detecting the awakening degree of the driver 30 with the physiological information is known, detailed explanations for the same will be omitted. The awakening degree information WI may be in the form of analog data or digital data.

The control device 13 is a device configured to control the stimulus providing device 11. The control device 13 includes an input interface 131, a processor 132, and an output interface 133.

The input interface 131 is configured to receive the awakening degree information WI outputted from the awakening degree detecting device 12. In a case where the awakening degree information WI is in the form of analog data, the input interface 131 includes an appropriate conversion circuit including an A/D converter.

The processor 132 is configured to determine whether the awakening degree of the driver 30 is less than a first threshold Th1 based on the awakening degree information WI. The processor 132 is configured to generate a first control signal CS1 in a case where it is determined that the awakening degree of the driver 30 is less than the first threshold Th1. The first control signal CS1 is a signal for causing the stimulus providing device 11 to provide a first stimulus including at least one of a vibration stimulus and an apparent motion stimulus.

The output interface 133 is configured to transmit the first control signal CS1 as generated to the stimulus providing device 11. The stimulus providing device 11 having received the first control signal CS1 provides the first stimulus including at least one of the vibration stimulus and the apparent motion stimulus corresponding to the first control signal CS1 to the driver 30.

The processor 132 is configured to generate a second control signal CS2. The second control signal CS2 is a signal for causing the stimulus providing device 11 to provide a second stimulus including at least one of a vibration stimulus and an apparent motion stimulus.

The output interface 133 is configured to transmit the second control signal CS2 as generated to the stimulus providing device 11 after the output of the first control signal CS1. For example, the output of the second control signal CS2 may be automatically performed after a prescribed time length elapses from the output of the first control signal CS1. The stimulus providing device 11 having received the second control signal CS2 provides the second stimulus including at least one of the vibration stimulus and the apparent motion stimulus corresponding to the second control signal CS2 to the driver 30. The first stimulus and the second stimulus may be the same or different from each other.

The first control signal CS1 and the second control signal CS2 may be analog signals or digital signals. In a case where the first control signal CS1 and the second control signal CS2 are analog signals, the output interface 133 includes an appropriate conversion circuit including a D/A converter.

Figure 4:
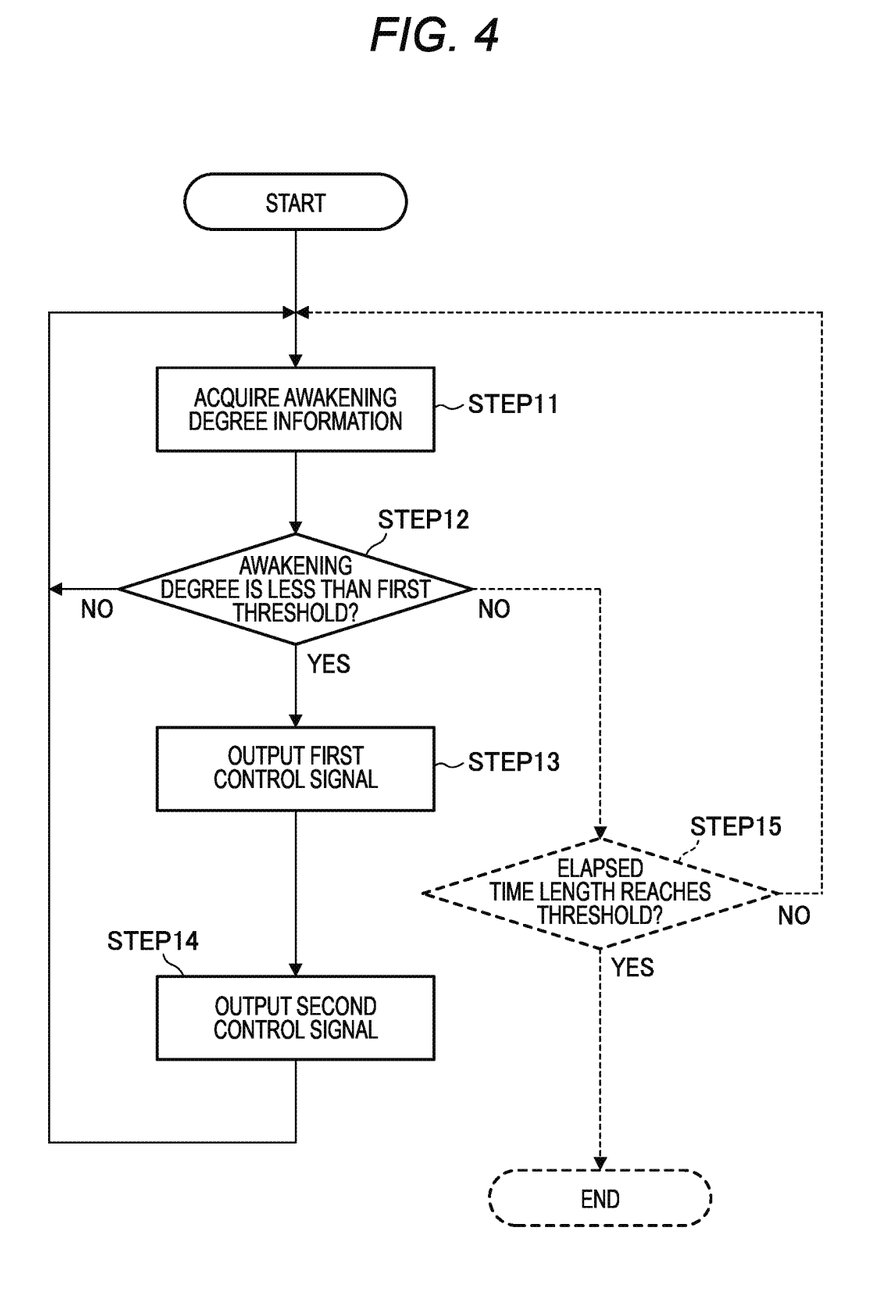
FIG. 4 illustrates an exemplary processing executed by a control device of FIG. 1.

FIG. 4 illustrates an example of processing to be executed by the control device 13 configured as described above. When the processing is initiated, the control device 13 acquires the awakening degree information WI outputted from the awakening degree detecting device 12 (STEP11).

Next, in STEP12, the control device 13 determines whether the awakening degree of the driver 30 indicated by the awakening degree information WI is less than the first threshold Th1. In a case where it is determined that the awakening degree is no less than the first threshold Th1 (NO in STEP12), the processing returns to STEP11, so that the acquisition of the awakening degree information WI and the determination as to the first threshold Th1 are repeated.

When it is determined that the awakening degree is less than the first threshold Th1 (YES in STEP12), the control device 13 outputs the first control signal CS1 for causing the stimulus providing device 11 to provide the prescribed first stimulus (STEP13). Examples of the first stimulus include an apparent motion stimulus of an electrical stimulus provided through the steering wheel 23.

Subsequently, the control device 13 outputs the second control signal CS2 for causing the stimulus providing device 11 to provide the prescribed second stimulus (STEP14). Examples of the second stimulus include a vibration stimulus provided through the seat 21.

After the second control signal CS2 is outputted, the processing returns to STEP11, so that the acquisition of the awakening degree information WI and the determination as to the first threshold Th1 are repeated.

Figure 5:
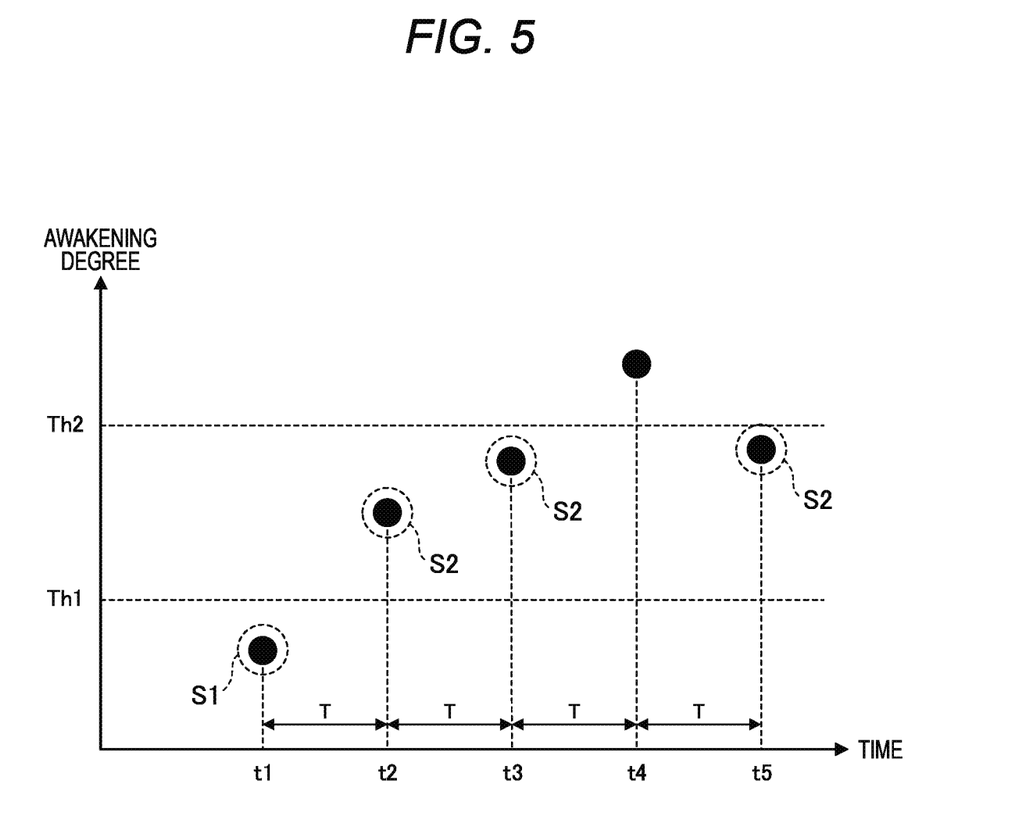
FIG. 5 illustrates an operation performed by the traveling support device of FIG. 1.

FIG. 5 illustrates a temporal change in the awakening degree of the driver 30. Since the awakening degree is less than the first threshold Th1 at a time point t1, a first stimulus S1 is provided. Thereafter, a second stimulus S2 is provided at a time point t2. For example, a time length T between the time point t1 and the time point t2 may be prescribed, so that the second stimulus S2 may be automatically provided.

The stimulus provided based on the first control signal CS1 serves to notify the driver 30 of a decrease in the awakening degree. As a result, the awakening degree of the driver 30 is prompted to be recovered. However, there may be a case where the recovery of the awakening degree of the driver 30 is insufficient only with the stimulus. According to the above configuration, after the stimulus based on the first control signal CS1 is provided, the stimulus based on the second control signal CS2 is additionally provided. As a result, the awakening degree of the driver 30 is further prompted to be recovered. Therefore, driving support can be realized by suppressing a decrease in the awakening degree of the driver 30.

Figure 6:
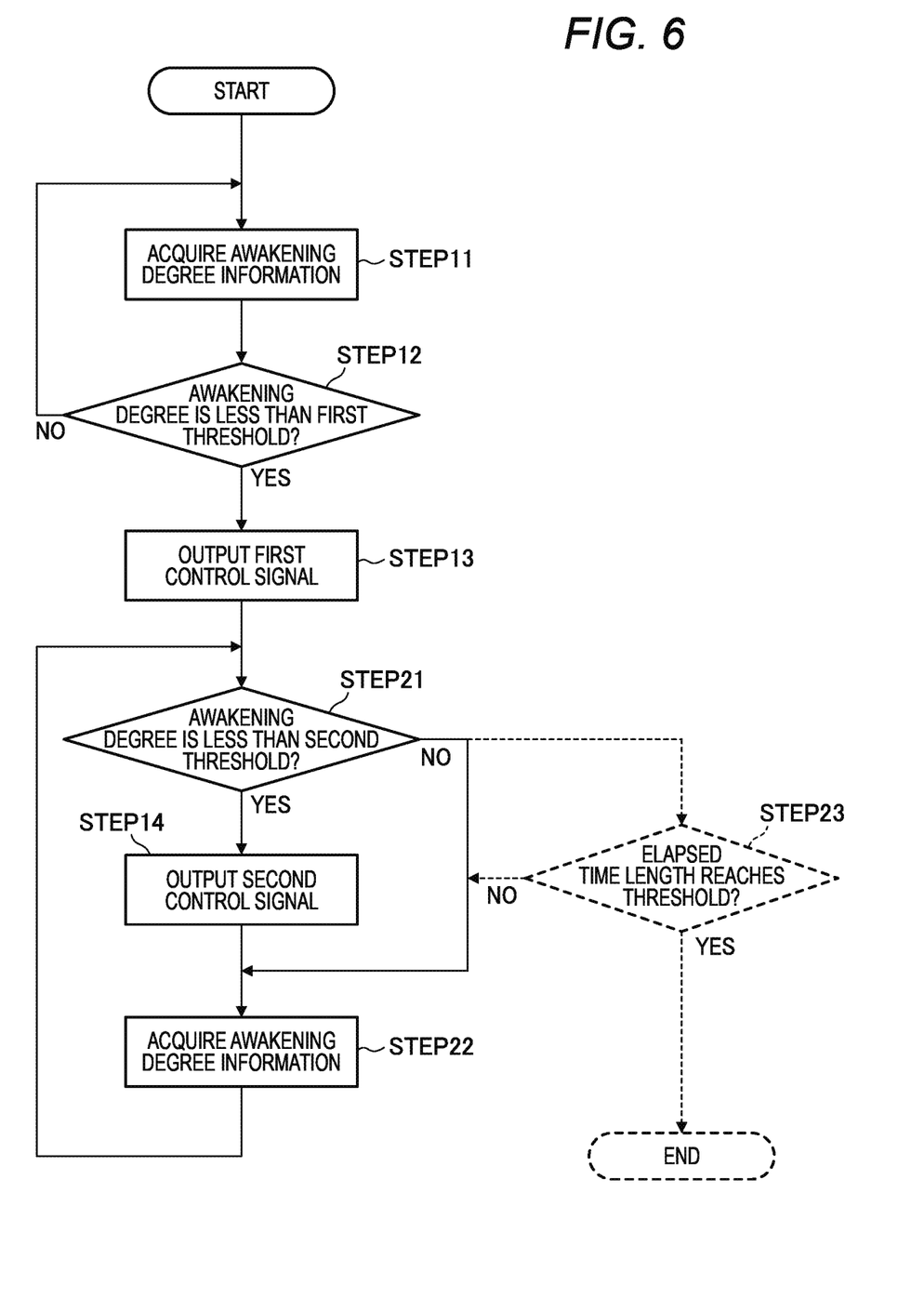
FIG. 6 illustrates another exemplary processing executed by the control device of FIG. 1.

FIG. 6 illustrates another example of the processing to be executed by the control device 13. Processing elements substantially the same as those in the example described with reference to FIG. 4 are assigned with the same reference numerals, and repetitive descriptions for those will be omitted.

In this example, after the output of the first control signal CS1 in STEP13, the control device 13 determines whether the awakening degree of the driver 30 indicated by the awakening degree information WI is less than a second threshold Th2 (STEP21). The second threshold Th2 is higher than the first threshold Th1.

When it is determined that the awakening degree is no less than the second threshold Th2 (NO in STEP21), the control device 13 acquires the awakening degree information WI from the awakening degree detecting device 12 (STEP22). Thereafter, the processing returns to STEP21, so that the determination as to the second threshold Th2 is repeated.

When it is determined that the awakening degree is less than the second threshold Th2 (YES in STEP21), the control device 13 outputs the second control signal CS2 for causing the stimulus providing device 11 to provide the prescribed second stimulus (STEP14).

Thereafter, the control device 13 acquires the awakening degree information WI from the awakening degree detecting device 12 (STEP22). Thereafter, the processing returns to STEP21, so that the determination as to the second threshold Th2 is repeated.

Namely, in this example, the control device 13 continues to monitor the awakening degree of the driver 30 after the output of the first control signal CS1, and repeats the output of the second control signal CS2 until the awakening degree reaches a value no less than the second threshold Th2.

In the case of the example illustrated in FIG. 5, since the awakening degree of the driver 30 is less than the second threshold Th2 at the time point t2 (YES in STEP21 of FIG.

6), the second stimulus S2 is provided (STEP14 of FIG. 6). In this case, the time length T between the time point t1 and the time point t2 is determined in advance as a cycle in which the awakening degree information WI is acquired.

Even at a time point t3 after the further elapse of the time length T, the awakening degree of the driver 30 is less than the second threshold Th2 (YES in STEP21 of FIG. 6). Accordingly, a second stimulus S2 is provided again (STEP14 of FIG. 6). At a time point t4 after the further elapse of the time length T, the awakening degree of the driver 30 exceeds the second threshold Th2 (NO in STEP21 of FIG. 6). Accordingly, the second stimulus S2 is not provided. At a time point t5 after the further elapse of the time length T, the awakening degree of the driver 30 is again less than the second threshold Th2 (YES in STEP21 of FIG. 6). Accordingly, a second stimulus S2 is provided again (STEP14 of FIG. 6).

According to such a configuration, the stimulus provided based on the second control signal CS2 may serve to recover and the awakening degree of the driver 30 to a higher level and maintain the same at the level. Accordingly, it is possible to further enhance the effect of suppressing the decrease in the awakening degree of the driver 30.

The processor 132 may generate the first control signal CS1 and the second control signal CS2 such that irregularity is involved in the position at which at least one of the vibration stimulus and the apparent motion stimulus is provided. Specifically, the processor 132 determines the stimulus providing device 11 from which the stimulus is to be provided through the use of a random number table or the like, and generates the first control signal CS1 and the second control signal CS2 so as to designate the stimulus providing device 11 as determined.

Figure 7:
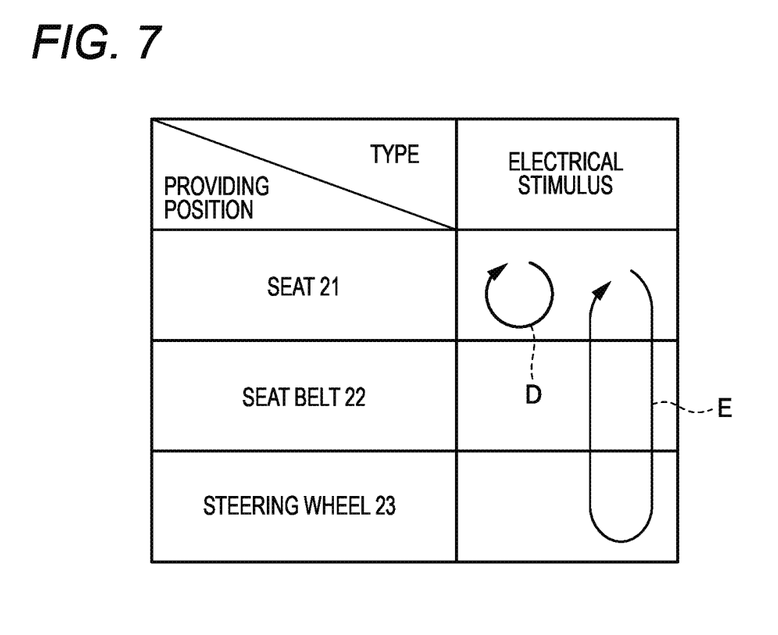
FIG. 7 illustrates a comparative example for explaining an operation of the traveling support device of FIG. 1.

As illustrated in FIG. 7, assuming a case where an apparent motion stimulus of an electrical stimulus is provided when the awakening degree of the driver 30 is less than the threshold value while the apparent motion stimulus of the electrical stimulus can be provided from each of the seat 21, the seat belt 22, and the steering wheel 23. The pattern D represents an example wherein the electrical stimulus is always provided from the seat 21. The pattern E represents an example wherein the position at which the electrical stimulus is provided is cyclically changed in the order of the seat 21, the seat belt 22, and the steering wheel 23. In either pattern, while the stimulus provisions are repeated, the driver 30 can get predictability for the position at which a stimulus is provided next time.

On the other hand, by generating the first control signal CS1 and the second control signal CS2 so as to involve the irregularity as to the position as described above, the apparent motion stimulus of the electrical stimulus is irregularly provided in any one of the seat 21, the seat belt 22, and the steering wheel 23. According to such a configuration, the driver 30 gets difficulty to predict the position at which a stimulus is provided next time. Since the unexpectedness of the stimulus can be maintained, the suppression of the decrease in the awakening degree of the driver 30 can be facilitated.

Additionally or alternatively, the processor 132 may generate the first control signal CS1 and the second control signal CS2 such that irregularity is involved in the timing at which at least one of the vibration stimulus and the apparent motion stimulus is provided. Specifically, the processor 132 determines a time interval the stimuli are repeatedly provided through the use of a random number table or the like, and generates the first control signal CS1 and the second control signal CS2 so as to designate the time interval as determined.

As an example, assuming a case where vibration stimuli are repeatedly provided from the seat 21 when the awakening degree of the driver 30 is less than a threshold value. In a case where the time interval between the repetitive vibration stimuli is constant, while the stimulus provisions are repeated, the driver 30 can get predictability for the timing at which a stimulus is provided next time.

On the other hand, by generating the first control signal CS1 and the second control signal CS2 so as to involve the irregularity as to the timing described above, the time interval between the repetitive vibration stimuli from the seat 21 can be made irregular. According to such a configuration, the driver 30 gets difficulty to predict the timing at which a stimulus is provided next time. Since the unexpectedness of the stimulus can be maintained, the suppression of the decrease in the awakening degree of the driver 30 can be facilitated.

In the case of the example of the processing described with reference to FIG. 4, the second control signal CS2 may be outputted so that irregularity is involved in the time length T from when the first control signal CS1 is outputted until when the second control signal CS2 is outputted. In this case, the control device 13 may determine the time length T through the use of a random number table or the like, and output the second control signal CS2 from the output interface 133 based on the time length T as determined.

In a case where the time length T from the provision of the first stimulus S1 to the provision of the second stimulus S2 is constant, while the stimulus provisions are repeated, the driver 30 can get predictability for the timing at which a second stimulus S2 is provided next time. However, according to the configuration as described above, the driver 30 gets difficulty to predict the timing at which a second stimulus S2 is provided next time. Since the unexpectedness of the stimulus can be maintained, the suppression of the decrease in the awakening degree of the driver 30 can be facilitated.

In the case of the processing example described with reference to FIG. 6, the control device 13 may be configured to involve irregularity in a time length T from the output of the first control signal CS1 until the awakening degree information WI is acquired next time. In this case, the control device 13 can determine the time length T through the use of a random number table or the like, and acquire the awakening degree information WI based on the time length T as determined.

According to such a configuration, the timing at which the second stimulus S2 is provided can be eventually made irregular. As a result, the driver 30 gets difficulty to predict the timing at which a second stimulus S2 is provided next time. Since the unexpectedness of the stimulus can be maintained, the suppression of the decrease in the awakening degree of the driver 30 can be facilitated.

Additionally or alternatively, the processor 132 may generate the first control signal CS1 and the second control signal CS2 such that irregularity is involved in an order in which the vibration stimulus and the apparent motion stimulus are provided. In other words, the first control signal CS1 and the second control signal CS2 are generated so that regularity is not involved in the relationship between the type of the first stimulus S1 and the type of the second stimulus S2. Specifically, the processor 132 determines a type of stimulus to be provided through the use of a random number table or the like, and generates the first control signal CS1 and the second control signal CS2 so as to designate the type of stimulus as determined.

Figure 8:
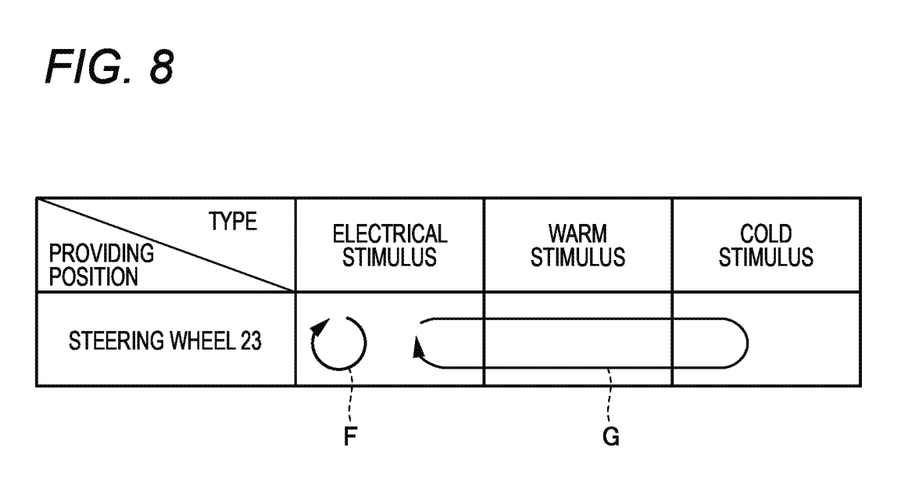
FIG. 8 illustrates a comparative example for explaining an operation of the traveling support device of FIG. 1.

As illustrated in FIG. 8, assuming a case where an apparent motion stimulus can be provided from the steering wheel 23 when the awakening degree of the driver 30 is less than a threshold. The pattern F represents an example in which the electrical stimulus is always provided as the second stimulus S2. The pattern G represents an example wherein the type of second stimulus to be provided is cyclically changed in the order of the apparent motion stimulus of the electrical stimulus, the apparent motion stimulus of the warm stimulus, and the apparent motion stimulus of the cold stimulus. In either pattern, while the stimulus provisions are repeated, the driver 30 can get predictability for the type of stimulus to be provided next time.

On the other hand, by generating the first control signal CS1 and the second control signal CS2 so as to involve the irregularity as to the order described above, any one of the apparent motion stimulus of the electrical stimulus, the apparent motion stimulus of the warm stimulus, and the apparent motion stimulus of the cold stimulus is irregularly presented from the steering wheel 23 for each of the first stimulus S1 and the second stimulus S2. According to such a configuration, the driver 30 gets difficulty to predict the type of stimulus to be provided next time. Since the unexpectedness of the stimulus can be maintained, the suppression of the decrease in the awakening degree of the driver 30 can be facilitated.

In this example, the first stimulus S1 and the second stimulus S2 are performed only with the apparent motion stimulus, and irregularity is introduced in connection with the selection of the type of the apparent motion used in each stimulus. However, the first stimulus S1 and the second stimulus S2 may be performed with both the vibration stimulus and the apparent motion stimulus. In this case, irregularity may be introduced in connection with the selection of the type of the apparent motion used in each stimulus.

The processor 132 may generate the first control signal CS1 and the second control signal CS2 by combining the irregularity as to the stimulus providing position described with reference to FIG. 7 and the irregularity as to the type of the stimulus to be provided described with reference to FIG. 8. According to such a configuration, the driver 30 gets further difficulty to predict the position and the type of stimulus to be provided next time. As a result, suppression of the decrease in the awakening degree of the driver 30 can be further facilitated.

The control device 13 may be configured to stop, based on the awakening degree information WI, the output of the second control signal CS2 in a case where a time length during which the awakening degree of the driver 30 is no less than the first threshold Th1 reaches a threshold.

Specifically, as illustrated in FIG. 4, when it is determined that the awakening degree of the driver 30 corresponding to the acquired awakening degree information WI is no less than the first threshold Th1 (NO in STEP12), the processor 132 starts clocking, and determines whether an elapsed time length from the start of clocking reaches the threshold (STEP15).

When it is determined that the elapsed time length does not reach the threshold (NO in STEP15), the processing returns to STEP11, so that the acquisition of the awakening degree information WI and the determination as to the first threshold Th1 are repeated. When it is determined that the elapsed time length reaches the threshold (YES in STEP15), the processing ends. Namely, the output of the second control signal CS2 is not performed at last.

Alternatively, as illustrated of FIG. 6, when it is determined that the awakening degree of the driver 30 is no less than the second threshold Th2 after the output of the first control signal CS1 (NO in STEP21), the processor 132 starts clocking, and determines whether the elapsed time length from the start of clocking reaches a threshold (STEP23).

When it is determined that the elapsed time length does not reach the threshold (NO in STEP23), the awakening degree information WI is acquired (STEP22), and the determination as to the second threshold Th2 is repeated (STEP21). When it is determined that the elapsed time length reaches the threshold (YES in STEP23), the processing ends. Namely, the output of the second control signal CS2 is not performed at last.

According to such a configuration, it is possible to prevent the stimulus provision from being repeated under a situation that it can be determined that the awakening degree of the driver 30 is maintained at an acceptable level. Accordingly, not only a decrease in the awakening degree of the driver 30 but also a decrease in the driving comfort can be suppressed.

Each function of the processor 132 described above can be implemented by a general-purpose microprocessor operating in cooperation with a general-purpose memory. Examples of the general-purpose microprocessor include a CPU, an MPU, and a GPU. Examples of the general-purpose memory include a ROM and a RAM. In this case, a computer program for executing the above-described processing can be stored in the ROM. The ROM is an example of a non-transitory computer-readable medium having stored a computer program. The processor 132 designates at least a part of the program stored in the ROM, loads the program on the RAM, and executes the processing described above in cooperation with the RAM. The above-described computer program may be pre-installed in the general-purpose memory, or may be downloaded from an external server device via a communication network and then installed in the general-purpose memory. In this case, the external server device is an example of the non-transitory computer-readable medium.

Each function of the processor 132 described above may be implemented by an exclusive integrated circuit such as a microcontroller, an ASIC, and an FPGA capable of executing the above-described computer program. In this case, the above-described computer program is pre-installed in a memory element included in the exclusive integrated circuit. The memory element is an example of the non-transitory computer-readable medium. Each function of the processor 122 may be implemented by a combination of the general-purpose microprocessor and the exclusive integrated circuit.

The above embodiments are merely illustrative for facilitating understanding of the gist of the presently disclosed subject matter. The configuration according to each of the above embodiments can be appropriately modified or changed without departing from the gist of the presently disclosed subject matter.

The above-described traveling support device 10 can be installed in a mobile entity other than a vehicle. Examples of such mobile entities include railways, ships, and aircrafts.

The stimulus provided by the above-described traveling support device 10 may be applied to an occupant other than the driver 30.

The present application is based on Japanese Patent Application No. 2019-151131 filed on Aug. 21, 2019, the entire contents of which are incorporated herein by reference.

The invention claimed is:

1. A traveling support device adapted to be installed in a mobile entity, comprising:
    an awakening degree detector configured to output awakening degree information corresponding to an awakening degree of an occupant of the mobile entity;
    a stimulus provider configured to provide the occupant with an apparent motion stimulus giving an illusion of motion presence with at least one of an electrical stimulus, a warm sensation and a cold sensation, at different members each of which is adapted to contact a portion of a body of the occupant; and
    a controller configured to output, based on the awakening degree information, a first control signal causing the stimulus provider to provide the apparent motion stimulus in a case where the awakening degree is less than a first threshold, and to output a second control signal causing the stimulus provider to provide the apparent motion stimulus after the first control signal is outputted,
    wherein the controller is configured to generate the first control signal and the second control signal such that the apparent motion stimulus is provided at one of the different members irregularly.

2. The traveling support device according to claim 1, wherein the controller is configured to output, based on the awakening degree information, the second control signal in a case where the awakening degree is less than a second threshold that is higher than the first threshold.

3. The traveling support device according to claim 1, wherein the controller is configured to generate the first control signal and the second control signal such that irregularity is involved in a timing at which the apparent motion stimulus is to be provided.

4. The traveling support device according to claim 1, wherein the controller is configured to stop, based on the awakening degree information, outputting the second control signal in a case where a time length during which the awakening degree is no less than the first threshold reaches a threshold.

5. A controller adapted to be installed in a mobile entity to control a stimulus provider configured to provide an occupant of the mobile entity with an apparent motion stimulus giving an illusion of motion presence with at least one of an electrical stimulus, a warm sensation and a cold sensation, at different members each of which is adapted to contact a portion of a body of the occupant, the controller comprising:
    an input interface configured to receive awakening degree information corresponding to an awakening degree of the occupant;
    a processor configured to generate, based on the awakening degree information, a first control signal and a second control signal each causing the stimulus provider to provide the apparatus motion stimulus in a case where the awakening degree is less than a first threshold; and
    an output interface configured to output the second control signal after the first control signal is outputted therefrom,
    wherein the processor is configured to generate the first control signal and the second control signal such that the apparent motion stimulus is provided at one of the different members irregularly.

6. A non-transitory computer-readable medium having stored a computer program to be executed by a controller adapted to be installed in a mobile entity to control a stimulus provider configured to provide an occupant of the mobile entity with an apparent motion stimulus giving an illusion of motion presence with at least one of an electrical stimulus, a warm sensation and a cold sensation, at different members each of which is adapted to contact a portion of a body of the occupant, the computer program being configured to, when executed, cause the controller to:
    output, based on awakening degree information corresponding to an awakening degree of the occupant, a first control signal causing the stimulus provider to provide the apparatus motion stimulus in a case where the awakening degree is less than a first threshold; and
    output a second control signal causing the stimulus provider to provide the apparent motion stimulus after the first control signal is outputted,
    wherein the computer program is configured to, when executed, cause the controller to generate the first control signal and the second control signal such that the apparent motion stimulus is provided at one of the different members irregularly.

* * * * *